P. J. HAMILL.
TIRE.
APPLICATION FILED JUNE 12, 1918.
1,299,333.
Patented Apr. 1, 1919.
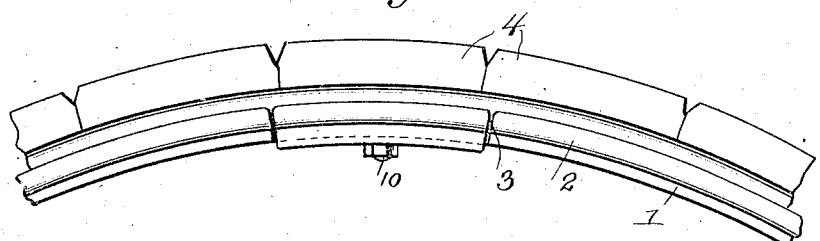
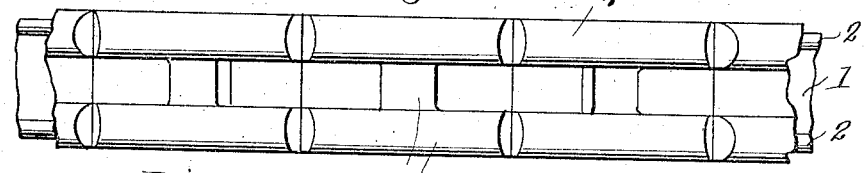
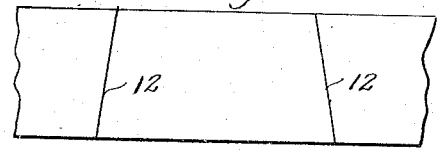
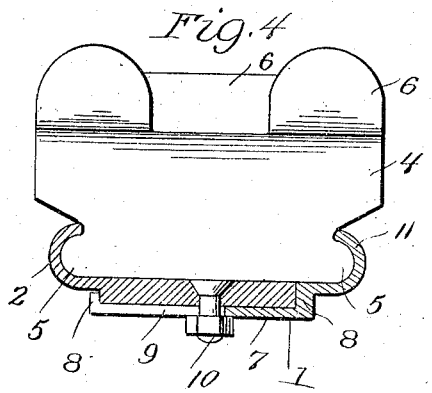
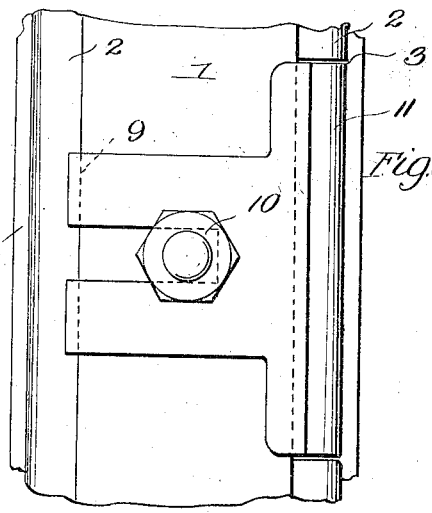
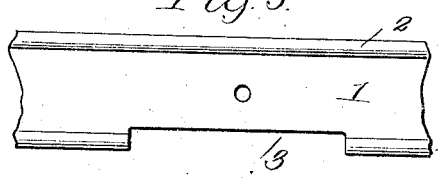
Inventor
Patrick J. Hamill
By Victor J. Evans
Attorney

UNITED STATES PATENT OFFICE.

PATRICK J. HAMILL, OF BOSWELL, PENNSYLVANIA.

TIRE.

1,299,333.  Specification of Letters Patent.  Patented Apr. 1, 1919.

Application filed June 12, 1918. Serial No. 239,595.

*To all whom it may concern:*

Be it known that I, PATRICK J. HAMILL, a citizen of the United States, residing at Boswell, in the county of Somerset and State of Pennsylvania, have invented new and useful Improvements in Tires, of which the following is a specification.

This invention relates to a tire construction and has for its primary object to provide a tire of such a construction that any distorted part thereof may be removed and a new portion substituted and thereby prolong the life of the tire.

An object of the invention is to provide a substantial tire capable of withstanding excessive strains owing to the fact that when parts of the tire are to be removed the same must travel at right angle in that direction in which the blocks tend to move in the use of the tire.

Besides the above my invention is distinguished in the novel manner of attaching a clamp plate to the rim so that the bolt will not be subject to a shearing action.

With these and other objects in view the invention will be better understood from the following detailed description taken in connection with the accompanying drawing wherein:

Figure 1 is a side elevation of a portion of the tire.

Fig. 2 is a top plan view thereof.

Fig. 3 is a top plan view of a portion of the rim.

Fig. 4 is an enlarged cross sectional view.

Fig. 5 is a detailed view of the plate looking toward the interior surface of the rim.

Fig. 6 is a view of a modified form of tire block.

It is of course to be understood that my invention may be illustrated in various other manners than shown but for the purpose of illustrating my invention, I have shown an ordinary tire rim 1 including clencher flanges 2 one of which is cut away to form an opening 3. The tire proper consists of a plurality of blocks 4 each constructed to be arranged in abutting relation and further provided with ribs 5 for engagement with the flanges 2. If found advantageous in practice the surface of the blocks may be provided with knobs 6 for increasing the effective grip between the blocks and the ground. Each block is of a length to pass through the openings 3 and to be arranged in place and when all the blocks are arranged in position the opening 3 is closed by any suitable device. In the drawing I have shown a plate 7 forming the closure and of a construction to engage the rim 1 in a manner to prevent lateral movement of the plate with relation to the rim as shown at 8. Passing through a slot 9 in the plate and engaging the rim 1, is a bolt 10. A portion of the plate is formed into a clencher flange 11 completely closing the slot 1 and establishing the continuity of the associated clencher flange with the result that the tire blocks cannot be accidentally displaced.

From the foregoing description taken in connection with the accompanying drawing it should be apparent that I provide a wheel of substantial construction in which any portion thereof may be readily renewed. Of course it is to be understood that my invention may be constructed in various other manners than that shown and therefore I do not desire to be limited to the exact showing except as set forth in the claim hereto appended.

Having described my invention, what I claim is:

A tire comprising in combination a rim having clencher flanges, one of which is provided with an opening, a plurality of tire blocks adapted to enter the opening and be engaged by said flanges and a plate for closing the opening shaped to be arranged in contact with the inner peripheral surface and the radial sides of the rim and a single element for clamping the plate in engagement with the rim.

In testimony whereof I affix my signature.

PATRICK J. HAMILL.